(12) United States Patent
Dunlap, III et al.

(10) Patent No.: US 11,643,164 B2
(45) Date of Patent: May 9, 2023

(54) BICYCLE DISC BRAKE ROTORS

(71) Applicant: SRAM, LLC, Chicago, IL (US)

(72) Inventors: Charles Dunlap, III, Manitou Springs, CO (US); Brian Jordan, Highland Park, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/896,152

(22) Filed: Jun. 8, 2020

(65) Prior Publication Data

US 2020/0407009 A1 Dec. 31, 2020

Related U.S. Application Data (63) Continuation-in-part of application No. 16/451,378, filed on Jun. 25, 2019.

(51) Int. Cl.
*F16D 65/12* (2006.01)
*B62L 1/00* (2006.01)
*F16D 65/02* (2006.01)

(52) U.S. Cl.
CPC ............ *B62L 1/005* (2013.01); *F16D 65/123* (2013.01); *F16D 65/126* (2013.01); *F16D 65/128* (2013.01); *F16D 2065/132* (2013.01); *F16D 2065/1328* (2013.01); *F16D 2200/003* (2013.01); *F16D 2200/0021* (2013.01); *F16D 2200/0039* (2013.01); *F16D 2200/0052* (2013.01); *F16D 2250/0046* (2013.01)

(58) Field of Classification Search
CPC ..... F16D 65/123–128; F16D 2065/132; F16D 2065/1328; F16D 2200/0021; F16D 2200/003; F16D 2200/0039; F16D 2200/0052; F16D 2250/0046; B62L 1/005
USPC ........ 188/18 A, 26, 218 XL, 264 A, 264 AA
See application file for complete search history.

(56) References Cited

U.S. PATENT DOCUMENTS

| | | | | |
|---|---|---|---|---|
| 5,735,366 A | * | 4/1998 | Suga | ................... F16D 65/0006 188/218 XL |
| 5,765,667 A | * | 6/1998 | Ross | ...................... F16D 65/12 188/218 XL |
| 9,791,008 B1 | * | 10/2017 | Wang | .................... F16D 65/128 |
| 2013/0133994 A1 | * | 5/2013 | Iwai | ........................ B60T 7/102 188/218 XL |
| 2013/0168193 A1 | * | 7/2013 | Iwai | ...................... F16D 65/128 188/218 XL |
| 2013/0180807 A1 | * | 7/2013 | Iwai | ........................ B62L 1/005 188/26 |

(Continued)

FOREIGN PATENT DOCUMENTS

| | | |
|---|---|---|
| CN | 103133574 | 6/2013 |
| CN | 103185094 | 7/2013 |

(Continued)

*Primary Examiner* — Christopher P Schwartz (57) ABSTRACT

Example bicycle disc brake rotors are described herein. An example disc brake rotor described herein includes a core having a brake surface core portion and a single-piece brake track coupled to the brake surface core portion. The brake track is constructed of stainless steel. The brake track includes a first track on a first side of the brake surface core portion, a second track on a second side of the brake surface core portion, and a connecting portion extending over a peripheral edge of the brake surface core portion between the first and second tracks.

18 Claims, 9 Drawing Sheets

(56) References Cited

U.S. PATENT DOCUMENTS

2015/0014104 A1    1/2015  Beer et al.

FOREIGN PATENT DOCUMENTS

| CN | 103216550 | 7/2013 |
| TW | 201321620 | 6/2013 |
| TW | 201331086 A | 8/2013 |
| TW | I543905 | 8/2016 |

* cited by examiner

BICYCLE DISC BRAKE ROTORS

RELATED APPLICATION

This patent is a continuation-in-part of U.S. patent application Ser. No. 16/451,378, filed Jun. 25, 2019, which is hereby incorporated by reference in its entirety.

FIELD OF THE DISCLOSURE

This disclosure relates generally to bicycle components and, more specifically, to bicycle disc brake rotors.

BACKGROUND

Bicycles and other two-wheel vehicles often include disc brakes. A disc brake includes a brake rotor and a brake caliper. The brake rotor is typically mounted to a hub on a wheel of the bicycle. When the brake caliper is actuated, the brake caliper moves one or more brake pads into engagement with the brake rotor, which slows the brake rotor and, thus, reduces the speed the bicycle.

SUMMARY

An example brake rotor for a bicycle disclosed herein includes a core having a brake surface core portion and a single-piece brake track coupled to the brake surface core portion. The brake track is constructed of stainless steel. The brake track includes a first track on a first side of the brake surface core portion, a second track on a second side of the brake surface core portion, and a connecting portion extending over a peripheral edge of the brake surface core portion between the first and second tracks.

Another example brake rotor for a bicycle disclosed herein includes a single-piece core having a hub mounting portion, a brake surface core portion, and an intermediate portion between the hub mounting portion and the brake surface core portion. The hub mounting portion is to be mounted to a hub of a wheel of the bicycle. The example brake rotor also includes a brake track having a first track on a first side of the brake surface core portion and a second track on a second side of the brake surface core portion. The intermediate portion of the core is wider than the brake track.

Another example brake rotor for a bicycle disclosed herein includes a core having a brake surface core portion and a brake track having a first track on a first side of the brake surface core portion and a second track on a second side of the brake surface core portion. The first and second tracks are to be engaged by brake pads. The brake track has a first recess formed in an outer surface of the first track. The first recess does not extend through the first track.

Another example brake rotor for a bicycle disclosed herein includes a core having a brake surface core portion. The brake surface core portion has a first side and a second side opposite the first side. The brake surface core portion has a first recess formed in the first side. The brake rotor also includes a brake track coupled to the brake surface core portion. The brake track includes a first track on the first side of the brake surface core portion. The first track is disposed along a contour of the first recess such that a second recess is formed in an outer surface of the first track.

Another example brake rotor for a bicycle disclosed herein includes a core having a brake surface core portion. The brake surface core portion has a first side and a second side opposite the first side. The brake surface core portion has a first recess formed in the first side and a second recess formed in the second side. The first recess is offset from the second recess in a radial direction. The brake rotor also includes a brake track coupled to the brake surface core portion. The brake track includes a first track on the first side of the brake surface core portion and a second track on the second side of the brake surface core portion.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Brakes on modern bicycles have evolved to utilize technology from automotive braking systems, such as disc brakes. Disc brakes have greater stopping power and deceleration control than traditional rim and cable pull brakes used in the past. The front and/or rear brakes on a bicycle may be implemented as disc brakes.

A disc brake includes a brake rotor and a brake caliper. The brake rotor is typically coupled to and rotates with a hub on a wheel of the bicycle. The brake caliper is mounted to a stationary part of the bicycle near the brake rotor. When the brake caliper is actuated, the brake caliper moves one or more brake pads into engagement with the outer surface(s) of the brake rotor. The friction between the brake pad(s) and the brake rotor causes the brake rotor to slow, thereby reducing the speed of the wheel and, thus, the bicycle. Typically, the brake rotor is constructed of a harder material than the brake pads, such that any wear is biased to the brake pads. Known brake rotors are constructed of stainless steel. While generally effective, stainless steel brake rotors are relatively heavy and add weight to the bicycle. Further, stainless steel has a relatively low thermal conductivity compared to other metals. As such, stainless steel brake rotors tend to remain relatively hot during and after use, which can reduce the stopping capability of the brake rotor.

Disclosed herein are example brake rotors for bicycles that address the above-noted issues. An example brake rotor disclosed herein includes a core constructed of a thermally conductive material, such as aluminum, and a brake track constructed of a wear-resistant material, such as stainless steel, that is different from the core material. The brake track is coupled to the core at or near an outer peripheral region of the core. The brake track forms the section of the brake rotor that is to be engaged by the brake pads. By using an aluminum core, for example, the brake rotor is lighter than known brake rotors constructed entirely of stainless steel. Therefore, the example brake rotor adds less weight to the bicycle than known stainless steel brake rotors. Further, the aluminum is more thermally conductive than the stainless steel. As such, the aluminum core acts as a heat sink that draws heat from the stainless steel brake track and dissipates the heat to the surrounding air. By drawing heat away from the brake track, the brake remains cooler and, thus, is more effective for braking. The combination of the aluminum core and the stainless steel brake track provides excellent braking capabilities while also reducing weight and heat.

In some examples, the core is constructed of a single piece of material such as aluminum. The core includes a hub mounting portion, an intermediate portion, and a brake surface core portion. The brake track is coupled to the brake surface core portion. The intermediate portion extends between the hub mounting portion and the brake surface core portion. In some examples, the intermediate portion of the core is wider (in the axial dimension) than the brake track. As such, when the brake rotor is viewed from the end, the intermediate portion of the core extends further in one or both directions than the brake track. This enables more air to contact and flow along the surfaces of the intermediate portion to help dissipate heat. In some examples, the intermediate portion includes a plurality of aerodynamic features, such as openings, that enable airflow through the core of the brake rotor. The openings increase the surface area of the core and provide better heat dissipation.

In some examples disclosed herein, the brake track is a single-piece brake track disposed on the brake surface core portion. The brake track extends over an outer peripheral edge of the brake surface core portion. For example, the brake track has a first track on a first side of the brake surface core portion, a second track on a second side of the brake surface core portion opposite the first side, and a connecting portion extending over the outer peripheral edge between the first and second tracks. As such, in some such examples, the brake track has a u-shaped or c-shaped cross-section.

In some examples, the brake track is formed via a thermal spray process such as a flame spray process or an arc spray process. For example, a coating material (e.g., stainless steel) may be melted and sprayed at the outer surfaces of the brake surface core portion. The coating material covers the sides and the outer peripheral edge of the brake surface core portion. The coating material hardens on the brake surface core portion and forms the brake track.

In some examples, one or more recesses are formed (e.g., via etching, via machining, via the result of recesses formed in the brake surface core portion, etc.) in the outer surfaces of the first and second tracks. The recesses help clear or remove dirt and debris from the brake pads when the brake pads come into contact with the first and second tracks, thereby improving braking performance. In some examples, the recesses do not extend completely through the first and second tracks. Instead, the recesses only extend partially into the first and second tracks. Additionally, in some examples, the brake rotor does not have any openings extending through the brake track or the brake surface core portion. As a result, the brake track completely covers the brake surface core portion of the core, and none of the brake surface core portion is exposed.

In some examples, the recesses in the outer surfaces of the first and second tracks are formed by corresponding recesses formed in the brake surface core portion. For example, one or more recesses can be formed in the first and second sides of the brake surface core portion. When the brake track material is applied to the brake surface core portion, the brake track material is disposed along the contours of the recesses, which forms corresponding recesses in the outer surface of the first and second tracks. In some examples, this results in less variation in the thickness of the brake track, which improves strength and wear resistance. In some examples, the recesses in the brake surface core portion are offset from each other in the radial direction. Additionally or alternatively, the recesses can be offset in the tangential and/or circumferential directions. This results in less variation in the thickness of the brake surface core portion, which enables more consistent thermal transfer and stress distribution across the brake surface core portion.

Figure 1:
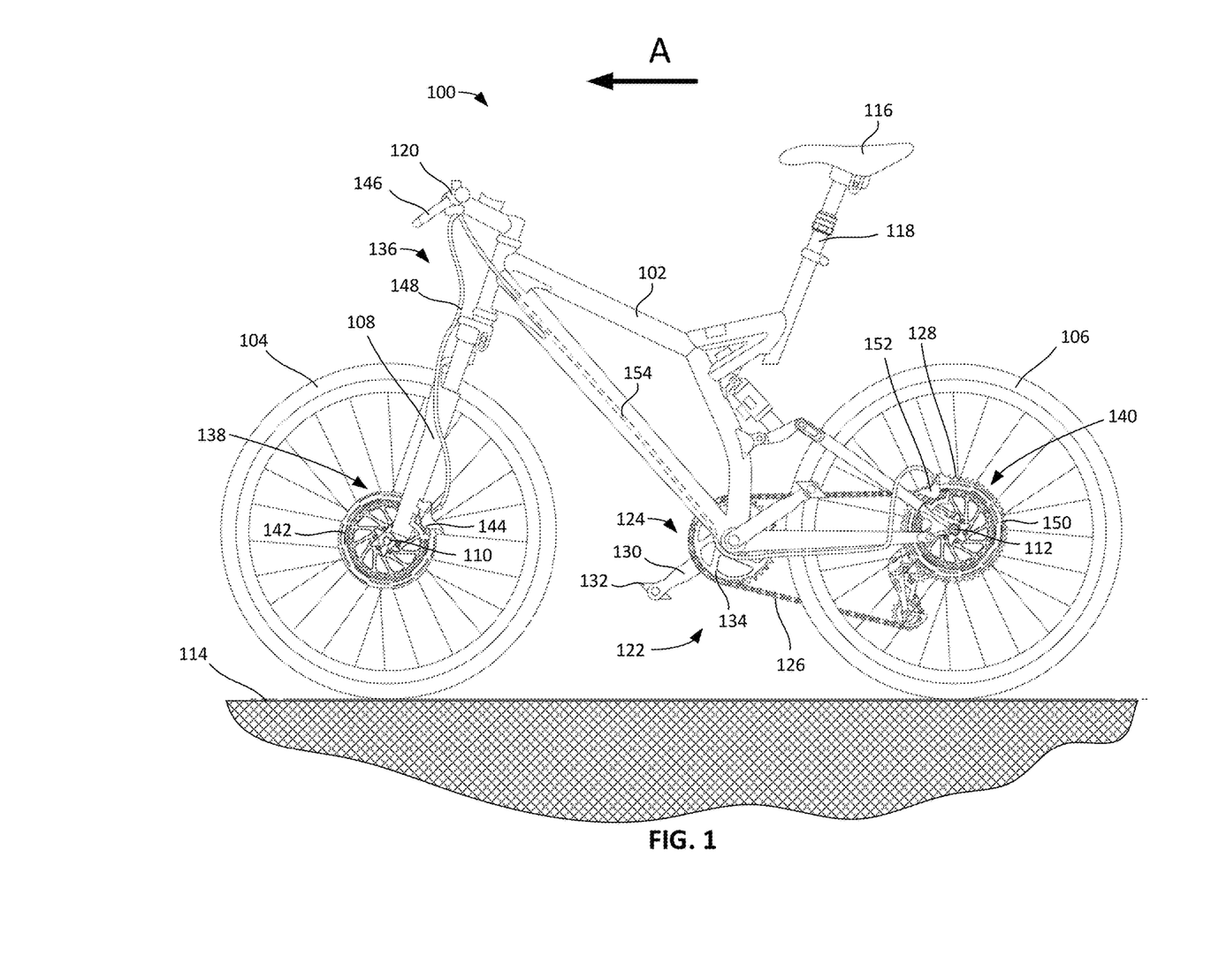
FIG. 1 is a side view of an example bicycle that may employ an example brake rotor constructed in accordance with the teachings of this disclosure.

Turning now to the figures, FIG. 1 illustrates one example of a human powered vehicle on which the example brake systems and apparatus disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. In some examples, the front fork 108 includes one or more suspension components (e.g., a shock absorber) to absorb shocks or vibrations. The front wheel 104 is rotatably coupled to the front fork 108 via a front hub 110. The rear wheel 106 is coupled to the frame 102 to support the rear end of the frame 102. The rear wheel 106 is rotatably coupled to the frame 102 via a rear hub 112. In some examples, one or more suspension components may be coupled between the rear wheel 106 and the frame 102 to absorb shocks or vibrations. A front and/or forward riding direction or orientation of the bicycle 100 is indicated by the direction of the arrow A in FIG. 1. As such, a forward direction of movement for the bicycle 100 is indicated by the direction of arrow A. The bicycle 100 is shown as riding on a riding surface 114. The riding surface 114 may be any riding surface such as the ground (e.g., a dirt path, a sidewalk, a street, etc.), a man-made structure above the ground (e.g., a wooden ramp), and/or any other surface.

In the illustrated example, the bicycle 100 includes a seat 116 coupled to the frame 102 (e.g., near the rear end of the frame 102 relative to the forward direction A) via a seat post 118. The bicycle 100 also includes handlebars 120 coupled to the frame 102 and the front fork 108 (e.g., near a forward end of the frame 102 relative to the forward direction A) for steering the bicycle 100. In the illustrated example, the bicycle 100 has a drivetrain 122 that includes a crank assembly 124. The crank assembly 124 is operatively coupled via a chain 126 to a sprocket assembly 128. The sprocket assembly 128 is mounted to the rear hub 112. The crank assembly 124 includes at least one, and typically two, crank arms 130 and pedals 132, along with at least one front sprocket, or chainring 134. The example bicycle 100 may include a rear gear change device (e.g., a derailleur) and/or a front gear change device to move the chain 126 through different sprockets.

The example bicycle 100 of FIG. 1 includes an example brake system 136 constructed in accordance with the teachings of this disclosure. The example brake system 136 may be used to reduce the speed of the bicycle 100. The example brake system 136 includes a front brake 138 for slowing the rotation of the front wheel 104 and a rear brake 140 for slowing the rotation of the rear wheel 106. In this example, the front and rear brakes 138, 140 are implemented as hydraulic disc brakes. The front brake 138 includes a front brake rotor 142 (sometimes referred to as a brake disc) and a front brake caliper 144. The front brake rotor 142 is coupled to and rotates with the front wheel 104 on the front hub 110. The front brake caliper 144 is coupled to the front fork 108 adjacent the front brake rotor 142. When the front brake caliper 144 is actuated, the front brake caliper 144 moves one or more brake pads into engagement with the front brake rotor 142 to slow the front brake rotor 142 and, thus, slow the rotation of the front wheel 104. In the illustrated example, the brake system 136 includes a front brake actuator 146 (e.g., a lever) that is used to actuate the front brake caliper 144. The front brake actuator 146 is coupled to the handlebars 120. The front brake actuator 146 is fluidly coupled to the front brake caliper 144 via a first fluid line 148. In this example, the front brake actuator 146 is actuated by moving the front brake actuator 146 toward the grip on the handlebars 120. This actuation causes brake fluid to be pushed to the front brake caliper 144 to provide braking pressure on the front brake rotor 142. Conversely, the front brake actuator 146 is de-actuated by releasing or otherwise moving the front brake actuator 146 away from the grip, which relieves or reduces the braking pressure to the front brake caliper 144.

Similarly, the rear brake 140 includes a rear brake rotor 150 and a rear brake caliper 152. The rear brake rotor 150 is coupled to and rotates with the rear wheel 106 via the rear hub 112. When the rear brake caliper 152 is actuated, the rear brake caliper 152 moves one or more brake pads into engagement with the rear brake rotor 150 to slow the rear brake rotor 150 and, thus, slow the rotation of the rear wheel 106. Similar to the front brake actuator 146, the brake system 136 includes a rear brake actuator (not shown) that is coupled to the handlebars 120 and used to actuate the rear brake caliper 152. The rear brake lever is fluidly coupled to the rear brake caliper 152 via a second fluid line 154. The rear brake actuator and the rear brake caliper 152 operate similar to the front brake actuator 146 and the front brake caliper 144.

While in this example the front and rear brakes 138, 140 are hydraulically actuated, in other examples, the front and/or rear brakes 138, 140 may be cable actuated. For example, the front brake actuator 146 may be coupled to the front brake caliper 144 via cable. When the front brake actuator 146 is moved toward the handlebars 120, the cable is pulled to actuate the front brake caliper 144. In the illustrated, the front and rear brake rotors 142, 150 are disposed on the left side of the front and rear wheels 104, 106 (when facing the direction A). In other examples, the front and/or rear brake rotors 142, 150 may be disposed on the right side of the front and rear wheels 104, 106, respectively.

While the example bicycle 100 depicted in FIG. 1 is a type of mountain bicycle, the example brake rotors disclosed herein can be implemented on other types of bicycles. For example, the disclosed brake rotors may be used on road bicycles, as well as bicycles with mechanical (e.g., cable, hydraulic, pneumatic, etc.) and non-mechanical (e.g., wired, wireless) drive systems. The disclosed brake rotors may also be implemented on other types of two-, three-, and four-wheeled human powered vehicles. Further, the example brake rotors can be used on other types of vehicles, such as motorized vehicles (e.g., a motorcycle, a car, a truck, etc.). The example brake rotors disclosed herein can be used with any road or trail conditions (e.g., hot, cold, wet, muddy, snowy, etc.).

Figure 2:
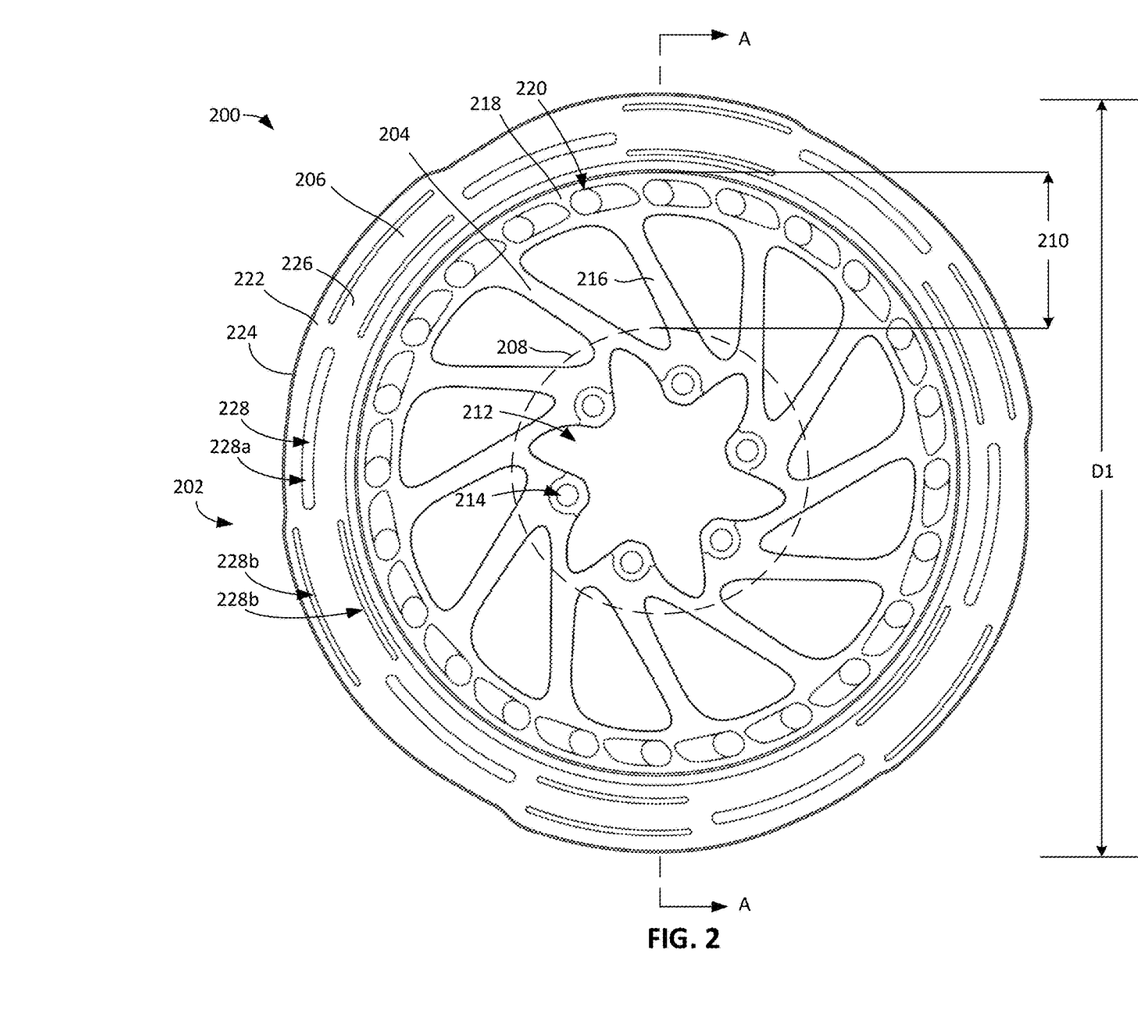
FIG. 2 is a side view of a first side of an example brake rotor that may be implemented on the bicycle of FIG. 1.
Figure 3:
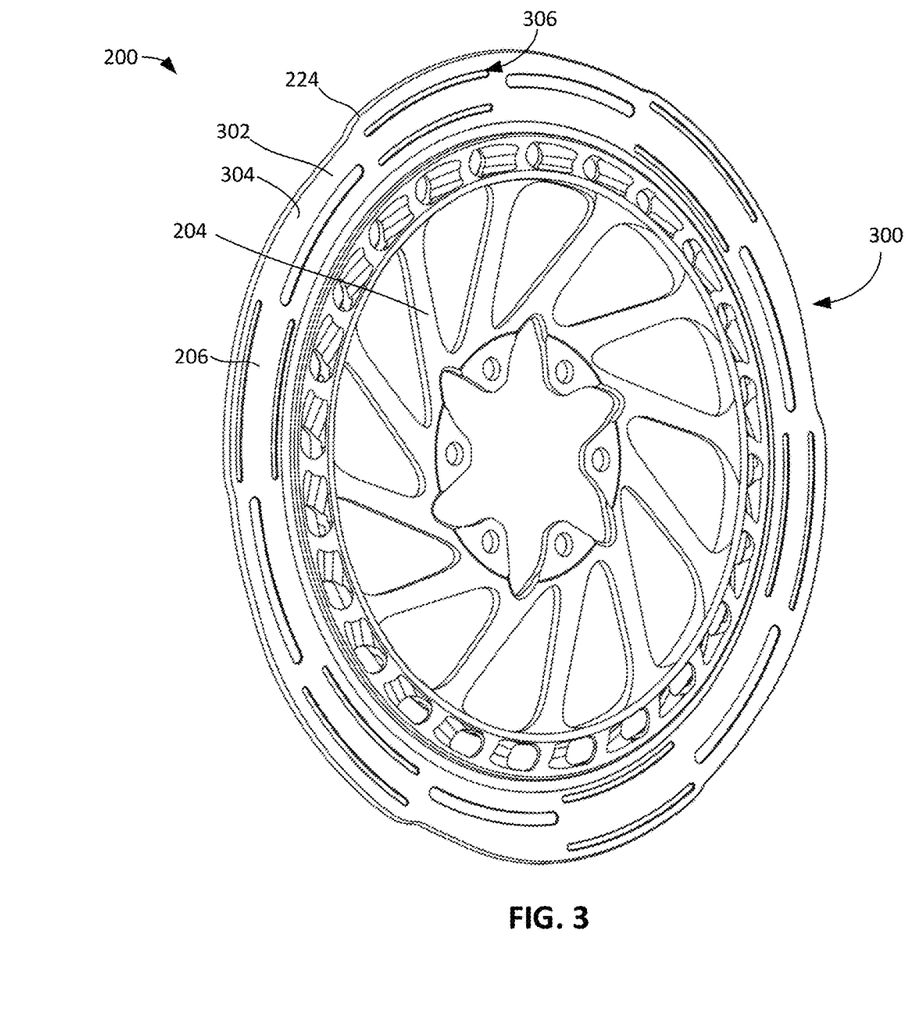
FIG. 3 is a perspective view of a second side of the example brake rotor of FIG. 2.

FIGS. 2 and 3 illustrate an example brake rotor 200 constructed in accordance with the teachings of this disclosure. The front brake rotor 142 and/or the rear brake rotor 150 of FIG. 1 may be implemented as the example brake rotor 200. FIG. 2 is a side view showing a first side 202 of the brake rotor 200 and FIG. 3 is a perspective view showing a second side 300 of the brake rotor 200 opposite the first side 202. As shown in FIGS. 2 and 3, the example brake rotor 200 includes a core 204 and a brake track 206. The core 204 is to be mounted on a hub, such as the front hub 110 or the rear hub 112 of the bicycle 100 of FIG. 1. The brake track 206 is coupled to an outer peripheral section (referred to as a brake surface core portion) of the core 204. The brake track 206 forms the part of the brake rotor 200 that is to be engaged by one or more brake pads. The brake track 206 may be constructed of an abrasive, wear-resistant material, as disclosed in further detail herein.

Figure 6:
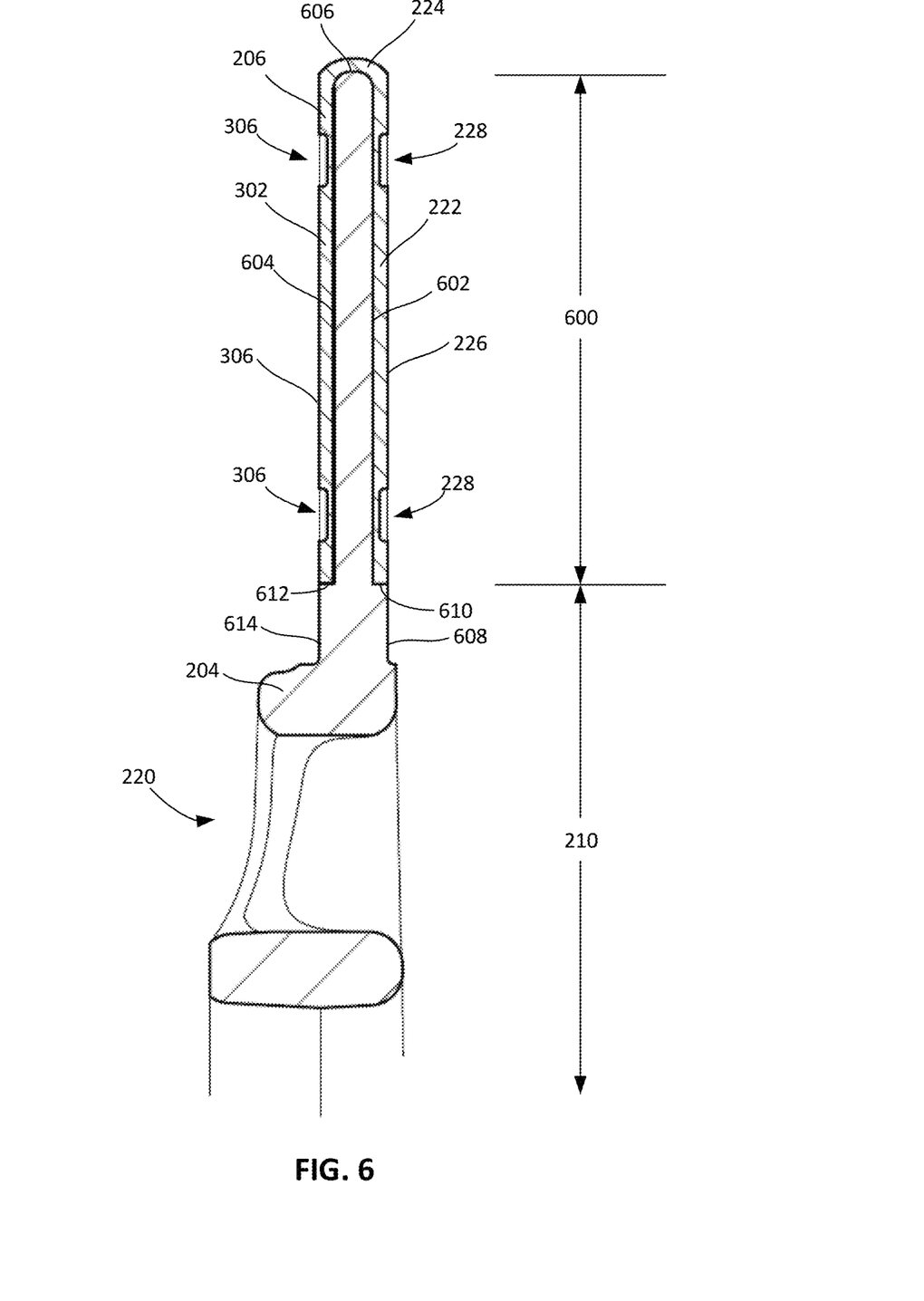
FIG. 6 is an enlarged view of the callout in FIG. 5.

As shown in FIG. 2, the core 204 has three portions including a hub mounting portion 208, an intermediate portion 210, and a brake surface core portion (which is covered by the brake track 206 in FIGS. 2 and 3, but shown in detail in connection with FIG. 6). The hub mounting portion 208 is to be mounted on a hub (e.g., the front hub 110 or the rear hub 112 of FIG. 1) of a wheel of a bicycle. The hub mounting portion 208 includes a central opening 212 to receive the hub and a plurality of fastener openings 214 (one of which is referenced in FIG. 2) to receive fasteners (e.g., bolts, screws, etc.) for coupling the brake rotor 200 to the hub. The hub mounting portion 208 may include any number of fastener openings 214 to match the corresponding fastener arrangement on the hub.

The intermediate portion 210 of the core 204 extends between the hub mounting portion 208 and a brake surface core portion (shown in FIG. 6). In the illustrated example, the intermediate portion 210 includes a plurality of arms 216 (one of which is referenced in FIG. 2) extending outward from the hub mounting portion 208. The arms 216 may also be referred to as support members. The intermediate portion 210 also includes a section 218 having a plurality of openings 220 (one of which is referenced in FIG. 2) extending between the first and second sides 202, 300 of the brake rotor 200. The arms 216 extend between the hub mounting portion 208 and the section 218 having the openings 220. In the illustrated example, the arms 216 are angled or curved (relative to the radial direction) to allow for thermal expansion to avoid brake surface warping. In some examples, the openings 220 act as aerodynamic features that improve airflow around and through the brake rotor 200. Further, the openings 220 enable airflow through the core 204 to assist with cooling. In the illustrated example, the openings 220 do not extend along axes that are perpendicular to a plane of the brake rotor 200. Instead, the openings 220 are angled or slanted. In some examples, this angled or slanted design helps funnel more air through the openings 220 than having openings that are perpendicular to the plane of the brake rotor 200. Additionally, this angled or slanted design increases the surface area of the intermediate portion 210 of the core 204, which further improves heat dissipation.

The core 204 can be constructed of a thermally conductive material, such as aluminum, an aluminum alloy, a metal matrix aluminum and alloy, copper and/or a copper alloy, and/or beryllium and/or a beryllium alloy. In other examples, the core 204 may be constructed of another thermally conductive material. In some examples, the core is constructed of a non-ferrous material, a carbon based material, or a ceramic material. The core can be constructed of any material for reducing weight and/or enabling higher thermal conductivity. In some examples, the core 204 is single-piece core constructed of a single unitary piece of material. In other words, the core 204 may be a continuous structure of material from the hub mounting portion 208 to the brake surface core portion (disclosed in further detail in FIG. 6). For example, the core 204 may be stamped or machined from a single piece of aluminum. Therefore, in some examples, the brake rotor 200 does not include or require any mechanical fasteners (e.g., bolts, screws, etc.). Thus, the brake rotor 200 is lighter than other known brake rotors that utilize fasteners to connect multiple parts or layers to form a core section. However, in other examples, the portions of the core 204 may be separate parts or components that are coupled together (e.g., via fasteners). For example, the intermediate portion 210 and/or the brake surface core portion may be constructed as separate components that can be coupled (e.g., via fasteners) to the hub mounting portion 208.

In the illustrated example, the brake rotor 200 has a diameter D1. The diameter D1 may be any diameter desirable. In some examples, the brake rotor 200 may be manufactured in a plurality of standard sizes, such as 120 mm, 140 mm, 160 mm, 180 mm, 200 mm, 220 mm, and 250 mm. In other examples, the brake rotor 200 may be manufactured to any desired diameter.

As disclosed herein, the brake track 206 forms the section of the brake rotor 200 that is to be engaged by the brake pad(s). As shown in FIGS. 2 and 3, the brake track 206 extends over a peripheral edge of the core 204. The brake track 206 has a first track 222 (FIG. 2), a second track 302 (FIG. 3), and a connecting portion 224 extending over the peripheral edge of the core 204 between the first and second tracks 222, 302. The first and second tracks 222, 302 may also be referred to as track portions, sections, plates, walls, legs, or layers. The first track 222, the second track 302, and the connecting portion 224 form a u-shaped or c-shaped cross-section, as shown in further detail in connection with FIG. 6. The outer surface of the first track 222 forms a first braking surface 226 and an outer surface of the second track 302 forms a second braking surface 304. The first and second braking surfaces 226, 304 are to be engaged by the brake pads.

In this example, the brake track 206 is a single unitary piece or structure. The brake track 206 is constructed of a high wear-resistant material (e.g., a material having a higher wear resistance than the core 204). In some examples, the brake track 206 is constructed of stainless steel. In other examples, the brake track 206 can be constructed of other materials, such as a steel alloy, a ferrous alloy, ceramic, a metal matrix aluminum and alloy, iron, or a super alloy. In some examples, the brake track 206 is formed via a thermal spray process (e.g., a flame spray process, an arc spray process), which is a process that produces a coating of material using heat from the combustion of fuel gas with oxygen to melt away a spray coating material (e.g., stainless steel) that is propelled onto the core 204. The coating material may be powder or wire form, which is then heated to a molten or semi-molten state and accelerated (sprayed) toward the core 204. The coating material cools and hardens to form the brake track 206 on the core 204. In other examples, the brake track 206 may be formed via another manufacturing process. For example, the brake track 206 may be formed as a two half sections that are coupled to the core 204 and welded together.

In some examples, the brake track 206 includes surface features to help remove debris from the brake pads and improve contact between the brake pads and the brake rotor 200 when the brake pads engage the brake rotor 200. For example, as shown in FIG. 2, the brake track 206 has a first set of recesses 228 (e.g., grooves) (one of which is referenced in FIG. 2) formed in the first braking surface 226 (the outer surface) of the first track 222. The first set of recesses 228 are elongated recesses that extend in a circumferential direction. In the illustrated example, the first set of recesses 228 include a repeating pattern of a wider recess 228*a* (located near a center) and pairs of thinner recesses 228*b* (located near the inner and outer sides). Similarly, as shown in FIG. 3, a second set of recesses 306 are formed in the second braking surface 304 (the outer surface) of the second track 302. The second set of recesses 306 also include a repeating pattern of a wider recess and pairs of thinner recesses. In other examples, other patterns of recesses may be used. In some examples, the recesses 228, 306 may not be entirely circumferential. For example, in some instances, the recesses 228, 306 may extend in both the circumferential and radial directions. The recesses 228, 306 may be formed by machining or material removal, laser etching, material vaporization, stamping, or forging, for example. As shown in further detail herein, the first set of recesses 228 do not extend completely through the first track 222 and the second set of recesses 306 do not extend completely through the second track 302. As such, the portion of the core 204 within the brake track 206 is not exposed. While in the illustrated example the first and second tracks 222, 302 each have 18 recesses, in other examples, the first and second tracks 222, 302 may have more or fewer recesses. In other examples, the first and second braking surfaces 226, 304 may not have any recesses. Instead, the first and second braking surfaces 226, 304 may be completely flat or smooth.

Figure 4:
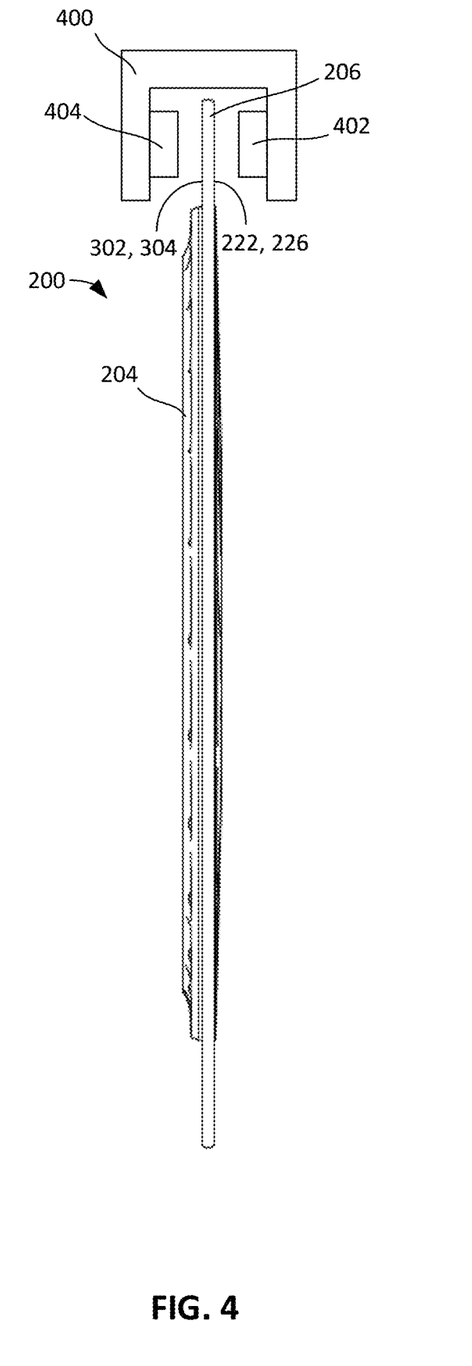
FIG. 4 is an end view of the example brake rotor of FIG. 2. An example brake caliper is also shown in FIG. 4.

FIG. 4 is an end view of the brake rotor 200. An example brake caliper 400 is also shown in FIG. 4. The brake caliper 400 may correspond to the front brake caliper 144 or the rear brake caliper 152 of FIG. 1, for example. The brake caliper 400 has a first brake pad 402 and second brake pad 404. The first and second brake pads 402, 404 may be constructed of organic and/or metal sintered material, for example. When the brake caliper 400 is actuated (e.g., hydraulically or via a cable), the first and second brake pads 402, 404 are moved into engagement with the first and second braking surfaces 226, 304 of the first and second tracks 222, 302, respectively, of the brake track 206. The frictional engagement between the first and second brake pads 402, 404 and the first and second braking surfaces 226, 204 slows the brake rotor 200, thereby slowing the bicycle 100. The frictional engagement between the first and second brake pads 402, 404 and the first and second braking surfaces 226, 204 also generates heat, which is dissipated via the core 204, as disclosed in further detail herein. When the rider releases the brake actuator, the first and second brake pads 402, 404 are moved away from the brake rotor 200 and the frictional interaction is ceased.

Figure 5:
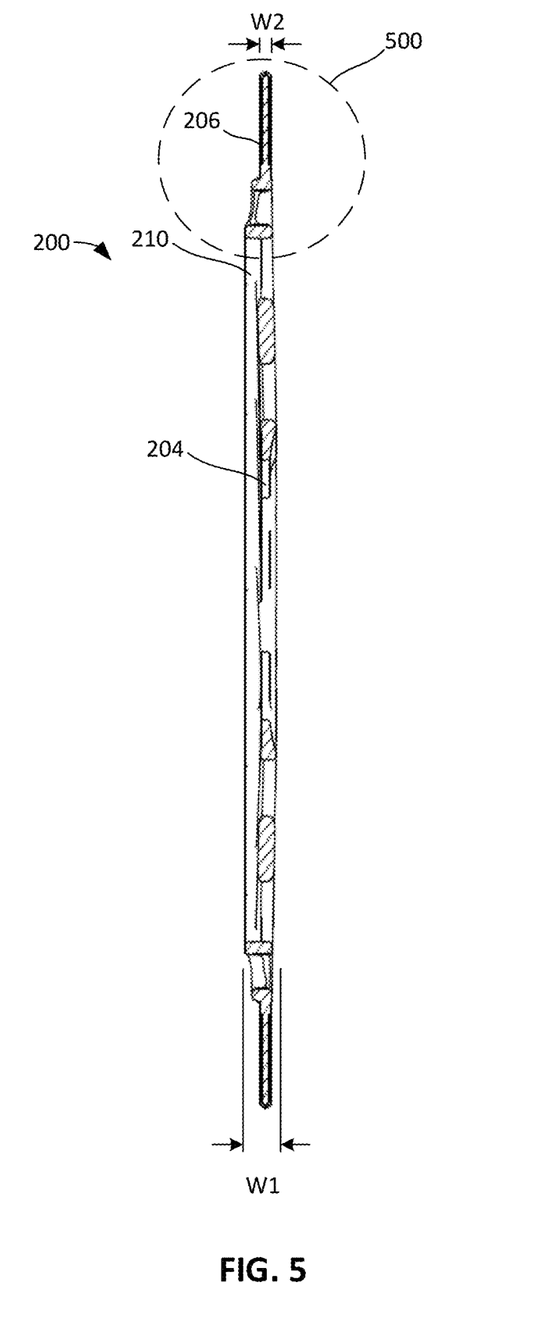
FIG. 5 is a cross-sectional view of the example brake rotor of FIG. 2 taken along line A-A of FIG. 2.

FIG. 5 is a cross-sectional view of the brake rotor 200 taken along line A-A of FIG. 2. As shown in FIG. 5 (and which can also be appreciated from FIG. 4), the core 204 has a thickness or width (i.e., an axial dimension) of W1 and the brake track 206 has a thickness or width of W2, which is less than W1. This enables the core 204 to have increased axial stiffness and strength to resist high temperature warping and ruptures. In some examples, the core 204 has a width of 1.7-2.0 mm, and the brake track 206 has a thickness of 0.05-0.25 mm per side. In other examples, the core 204 and/or the brake track 206 can have different widths and/or thicknesses. In the illustrated example, the intermediate portion 210 forms the widest portion of the core 204. The intermediate portion 210 of the core 204 is wider than the brake track 206. As such, a larger area of the intermediate portion 210 is exposed to oncoming airflow, which helps dissipate heat and reduce the temperature of the brake rotor 200. In the illustrated example, the intermediate portion of the core 204 extends further outward on both sides than the brake track 206. In other examples, one side of the intermediate portion 210 may be substantially flush or even with one side of the brake track 206 while the other side of the intermediate portion 210 extends outward from the other side of the brake track 206.

FIG. 6 is enlarged view of the callout 500 in FIG. 5. As shown in FIG. 6, the core 204 has a brake surface core portion 600 extending radially outward from the intermediate portion 210. The brake track 206 is coupled to and surrounds the brake surface core portion 600. The brake surface core portion 600 has a first side 602, a second side 604, and an outer peripheral edge 606 between the first and second sides 602, 604. The outer peripheral edge 606 forms an outer peripheral edge of the core 204.

As shown in FIG. 6, the first track 222 of the brake track 206 is in contact with and covers the first side 602 of the brake surface core portion 600. The second track 302 is in contact with and covers the second side 604 of the brake surface core portion 600. The connecting portion 224 extends over (and is in contact with) the outer peripheral edge 606 between the first and second tracks 222, 302. The first track 222, the second track 302, and the connecting portion 224 form a u-shaped or c-shaped cross-section.

As disclosed herein, in some examples, the brake track 206 is formed using a thermal spray process (e.g., a flame spray process, an arc spray process). For example, a rod or powder of coating material (e.g., stainless steel) may be melted or sintered and sprayed at the brake surface core portion 600 to form a coating on the first and second sides 602, 604 and the outer peripheral edge 606. The melted or sintered coating material bonds to the first and second sides 602, 604 and the outer peripheral edge 606. The coating material dries and hardens to form the brake track 206. The brake track 206 is permanently coupled to the core 204. As such, no other fastening means (e.g., bolts, adhesives, etc.) are needed to couple the brake track 206 to the core 204. In other examples, the brake track 206 may be formed separately first, and then coupled to the core 204 (e.g., via an adhesive, via welding, via diffusion bonding, via one or more fasteners, etc.).

As disclosed above, the brake track 206 is in direct contact with the core 204, which improves thermal transfer. The core 204 is constructed of a lighter, thermally conductive material, such as aluminum, while the brake track 206 can be constructed of a wear-resistant material, such as stainless steel. The core 204 acts as a heat sink to draw heat away from the brake track 206 and dissipate the heat into the surrounding air, thereby reducing peak operating temperatures of the brake track 206. In particular, heat generated by the frictional engagement between the brake pads and the brake track 206 is transferred from the brake track 206 to the brake surface core portion 600. The heat is transferred from the brake surface core portion 600 radially inward to the intermediate portion 210 of the core 204. The intermediate portion 210 is exposed to the air, which dissipates heat (via convection) into the surrounding air to cool the brake rotor 200. Additionally, the airflow through the openings 220 helps further transfer heat away from the brake rotor 200. Even after the brake is released, the core 204 continues to dissipate heat from the brake track 206. As such, the core 204 reduces the temperature of the brake track 206 and, thus, improves the braking ability of the brake track 206. The example brake rotor 200 has reduced braking surface temperatures for more consistent pad-rotor coefficient of friction, lower caliper temperatures for more consistent fluid pressure (when used with hydraulic systems), reduced component/seal damage (e.g., seals within the brake caliper that may be affected by heat), and resistance to brake fluid vapor fade (hydraulic fluid boil).

In the illustrated example, the connecting portion 224 of the brake track 206 is at least partially rounded or curved between the first and second tracks 222, 302, which reduces or eliminates sharp edges on the brake rotor 200. In some examples, the connecting portion 224 is rounded or curved with a radius that is half the thickness of the brake track 206. In other examples, the radius may be larger or smaller. In the illustrated example, the outer peripheral edge 606 of the brake rotor 200 is also rounded or curved. In some examples, the outer periphery edge 606 is rounded or curved with a radius that is half the thickness of the brake surface core portion 600. In other examples, the radius may be larger or smaller. For example, the outer peripheral edge may be formed with a radius ranging from 10% to 300% of the brake track thickness. The radius of the outer peripheral edge may be constant or variable about the edge. In other examples, the connecting portion 224 and/or the outer peripheral edge 606 may not be rounded or curved.

In the illustrated example, a first side 608 of the core 204 has a first ledge 610 formed between the intermediate portion 210 and the brake surface core portion 600. The first track 222 extends down to and is in contact with the first ledge 610. In this example, the thickness or width of the first track 222 is the same as the depth of the first ledge 610. As a result, the first braking surface 226 of the first track 222 is aligned (e.g., flush) with an outer surface of the intermediate portion 210 adjacent the first ledge 610. Similarly, a second ledge 612 is formed on a second side 614 of the core 204 opposite the first side 608 between the intermediate portion 210 and the brake surface core portion 600. The second track 302 extends down to and is in contact with the second ledge 612. The second braking surface 304 is aligned (e.g., flush) with the outer surface of the intermediate portion 210 adjacent the second ledge 612. In other examples, the depth of the first and second ledges 610, 612 and/or the thickness of the first and second tracks 222, 302 may be changed such that the first and second tracks 222, 302 are raised from or recessed relative to the adjacent surfaces on the intermediate portion 210.

As shown in FIG. 6, the first set of recesses 228 do not extend through the first track 222 and the second set of recesses 306 do not extend through the second track 302. Instead, the recesses 228, 306 only extend partially (e.g., 25%, 50%, 75%, etc.) into the respective first and second tracks 222, 302. As a result, the brake surface core portion 600 is not visible or exposed through the brake track 206. In this example, the brake surface core portion 600 and the brake track 206 do not have any openings or holes extending there-through. The brake surface core portion 600 is entirely covered by the brake track 206 and none of the brake surface core portion 600 is exposed. However, in other examples, one or more openings or holes may be formed through the first track 222, the second track 302, and/or the brake surface core portion 600.

As an example manufacturing process, the core 204 may constructed first. For example, the core 202 may be stamped from a single piece of material, such as aluminum. The central opening 212, the fastener openings 214, the arms 216, the openings 220, and other any other edges or surfaces may be machined in the piece of aluminum. In other examples, the core 204, including the central opening 212, the fastener openings 214, the arms 216, and/or the openings 220, can be constructed via other stamping, machining, forging or casting techniques. The brake track 206 may be formed on the brake surface core portion 600 via a thermal spray process. In some examples, after the brake track 206 is formed on the core 204, the brake track 206 is machined, formed, or grinded (e.g., the connecting portion 224 is rounded). The first and second sets of recesses 228, 306 may then be machined, etched, stamped, forged, or coined in the first and second braking surfaces 226, 304 of the respective first and second tracks 222, 302. In other examples, the recesses 228, 306 may be formed as a result of recesses in the brake surface core portion 600, as disclosed in further detail in connection with FIGS. 8-11.

Figure 7:
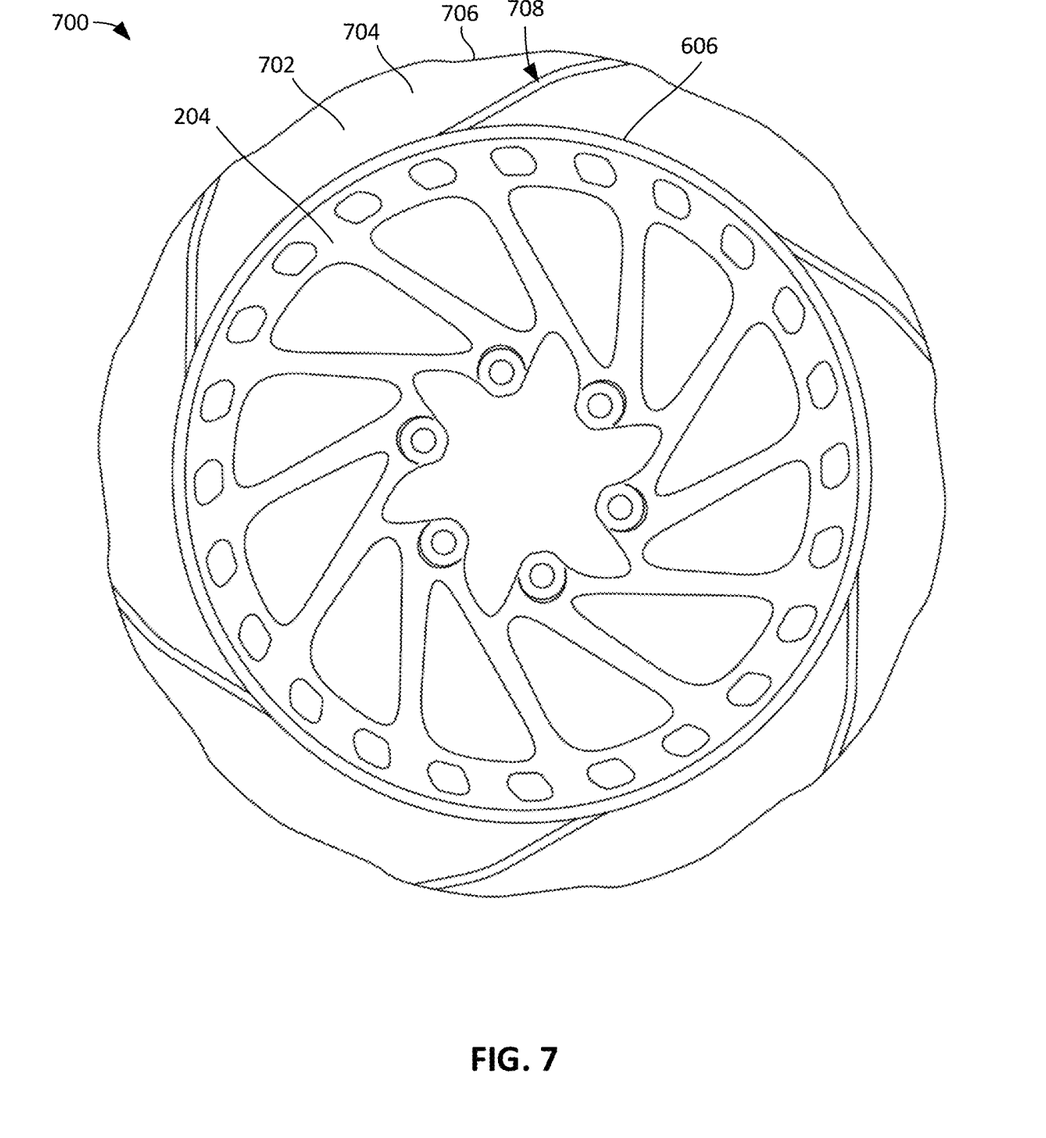
FIG. 7 illustrates another example brake rotor having an alternative brake track recess pattern.

FIG. 7 is a side view of another example brake rotor 700 that can be implemented on the bicycle 100 (FIG. 1). The example brake rotor 700 includes the core 204, which is the same as the core 204 disclosed above in connection with the brake rotor 200 of FIGS. 2-6. The brake rotor 700 includes a brake track 702 with an alternative brake track recess pattern. Similar to the brake track 206 disclosed above, the brake track 702 has a first track 704 on the first side 602 (FIG. 6) of the brake surface core portion 600 (FIG. 6), a second track (not seen in FIG. 7) on the opposite side of the brake surface core portion 600, and a connecting portion 706 extending over the outer peripheral edge 606 (FIG. 6) between the first track 704 and the second track. The brake track 702 is substantially the same as the brake track 206 disclosed above. Thus, any of the examples aspects disclosed above in connection with the brake track 206 can likewise be applied to the brake track 702.

In this example, the brake track 702 has a first set of recesses 708 (e.g., grooves) (one of which is referenced in FIG. 7) formed in the outer surface of the first track 704. The recesses 708 help clear dirt and debris from a brake pad (e.g., the first brake page 402 (FIG. 44) when the brake pad is engaged with the brake track 702. In this example, each of the recesses 708 extends across the braking surface, which is defined by the region of contact between the outer surface of the first track 704 and a brake pad. In this example, each of the recesses 708 extends from the first ledge 606 to the connecting portion 706 (e.g., to the outer radial edge of the brake rotor 700). The second track on the opposite side may include a similar pattern of recesses. This type of recess can be referred to as a fully sweeping recess, because the recesses 708 fully sweep the braking surface (i.e., the outer surface of the brake track 702 engaged by a brake pad). Fully sweeping recess patterns are defined by any size circle drawn on a braking surface, concentric with the rotor center axis, that intersects a recess in at least one location on the braking surface. This type of recess may be beneficial because the brake pad pushes dirt and debris from the brake pad and/or the braking surface into the recesses 708 as the brake pad slides along the braking surface. In some examples, one or more of the recesses 708 extend beyond the braking surface (e.g., to the outer radial edge of the brake rotor 700), such that the dirt and/or debris in the recesses 708 can be expelled from the brake rotor 700, thereby improving braking performance. In other examples, the recesses 708 may not extend beyond the braking surface. In such an example, the dirt or debris may remain in the recesses 708 until washed or removed. In some examples, two or more recesses may sweep the braking surface. For example, a first recess may extend from an inner diameter of the braking surface to a middle section of the braking surface, and a second recess may extend from the middle section to an outer diameter of the braking surface. In such an example, at least one of the recesses intersects any sized concentric circle drawn on the braking surface of the first track 704. In some examples, as shown in FIG. 7, the outer peripheral edge 606 (FIG. 6) of the brake rotor 700 (which is covered by the connecting portion 706 of the brake track 702) has a variable outer-diameter profile. In this example, the recesses 708 extend to the outer radial edge of the brake rotor 700 at locations where the outer-diameter is largest. In other examples, the recesses 708 may not extend all the way to the outer radial edge. In some such examples, the change in the outer-diameter may overlap with the recesses 708 in the circumferential direction, such that the outer peripheral edge of the brake rotor 700 can also sweep a portion of the brake pad to remove dirt or debris. Therefore, in some examples, any sized concentric circle drawn on the braking surface is intersected by at least one recess or an outer radial edge (e.g., the connecting portion 706) of the brake rotor 700. The recesses 708 may be formed by machining or material removal, laser etching, material vaporization, stamping, or forging, for example. Similar to the recesses 228, 306 disclosed above, the recesses 708 do not extend completely through the first track 704. Instead, the recesses 708 only extend partially (e.g., 25%, 50%, 75%, etc.) into the first track 704. As a result, the brake surface core portion 600 (FIG. 6) is not visible or exposed through the brake track 702. The brake rotor 700 does not include any openings or holes through the brake track 702. The brake surface core portion 600 is entirely covered by the brake track 702.

Figure 8:
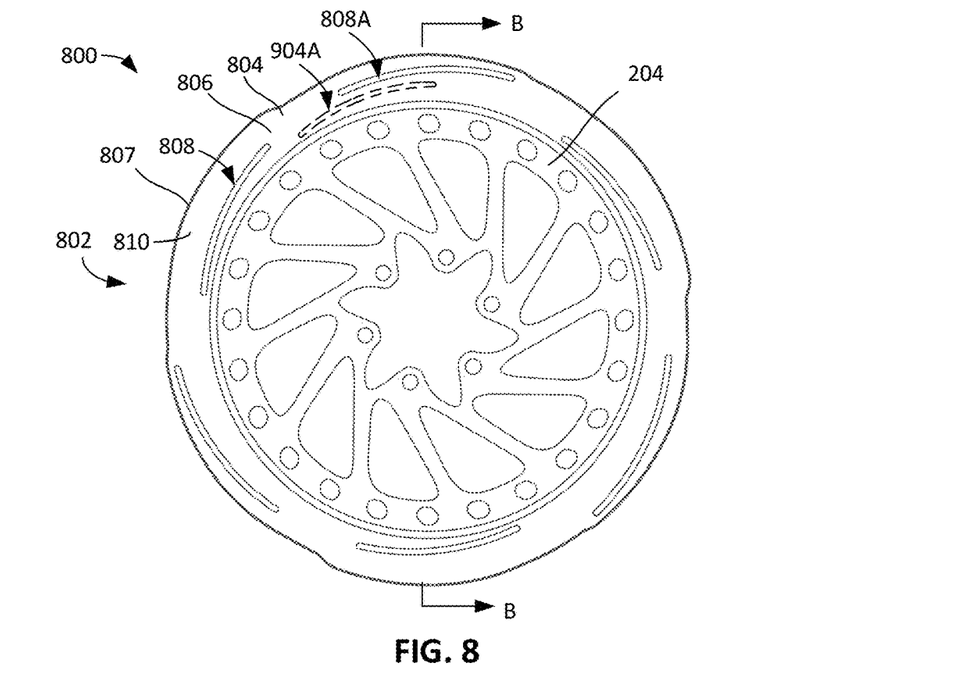
FIG. 8 is a side view of a first side of another example brake rotor having an alternative brake track recess pattern.
Figure 9:
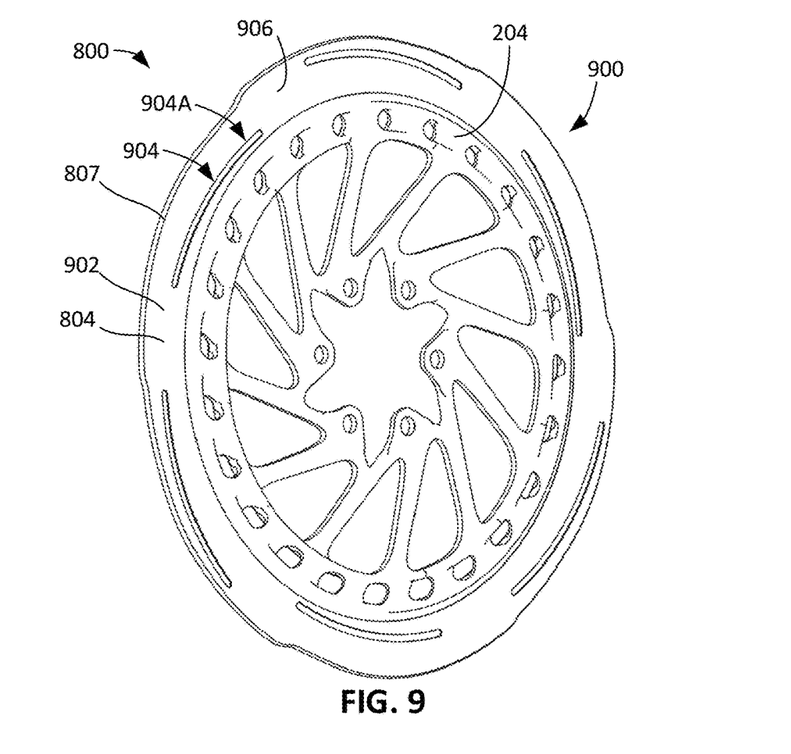
FIG. 9 is a perspective view of a second side of the example brake rotor of FIG. 8.

FIGS. 8 and 9 illustrate another example brake rotor 800 that can be implemented on the bicycle 100 (FIG. 1). FIG. 8 is a side view showing a first side 802 of the brake rotor 800 and FIG. 9 is a perspective view showing a second side 900 of the brake rotor 800 opposite the first side 802. The example brake rotor 800 includes the core 204, which is substantially the same as the core 204 disclosed above in connection with the brake rotor 200 of FIGS. 2-6 and the brake rotor 700 of FIG. 7. However, the core 204 in this example includes recesses in the brake surface core portion 600, disclosed in further detail in connection with FIG. 11. The brake rotor 800 includes a brake track 804 with an alternative brake track recess pattern. Similar to the brake track 206 and the brake track 702 disclosed above, the brake track 804 has a first track 806 on the first side 602 (FIG. 6) of the brake surface core portion 600 (FIG. 6), a second track 902 on the second side 604 (FIG. 6) of the brake surface core portion 600, and a connecting portion 807 extending over the outer peripheral edge 606 (FIG. 6) between the first track 806 and the second track 902. The brake track 804 is substantially the same as the brake tracks 206, 702 disclosed above. Therefore, any of the examples aspects disclosed above in connection with the brake tracks 206, 702 regarding materials, construction techniques, relative dimensions, etc. can likewise be applied to the brake track 804.

In this example, the brake track 804 has a first set of recesses 808 (e.g., grooves) (one of which is referenced in FIG. 8) formed in an outer surface 810 (e.g., a braking surface) of the first track 806, and a second set of recesses 904 (one of which is referenced in FIG. 9) formed in an outer surface 906 (e.g., a braking surface) of the second track 902. The recesses 808, 904 help clear dirt and debris from the brake pads (e.g., the first and second brake pads 402, 404 (FIG. 4)) when the brake pads are engaged with the first and second tracks 806, 902, respectively. In the illustrated example, the recesses 808, 904 generally extend in the circumferential direction and radial directions. In this example, the recesses 808 on the first track 806 are offset from the recesses 904 on the second track 902. In particular, the recesses 808 and the recesses 904 are not aligned on opposite sides of the brake rotor 800. For example, the location of one of the recesses 904A on the second track 902 is shown in FIG. 8 relative to one of the recesses 808A on the first track 806. As shown, the recess 904A on the second track 902 is offset from the recess 808A on the first track 806 in the radial direction. Additionally or alternatively, the recesses 808, 904 can be offset in the tangential and/or circumferential directions. The recesses 808, 904 may be formed by machining or material removal, laser etching, material vaporization, stamping, or forging, for example. Similar to the recesses 228, 306 disclosed above, the recesses 808, 904 do not extend completely through the first and second track 806, 902, respectively. As a result, the brake surface core portion 600 (FIG. 6) is not visible or exposed through the brake track 804. In this example, the brake rotor 800 does not include any openings or holes through the brake track 804. The brake surface core portion 600 is entirely covered by the brake track 804.

In some of the examples disclosed above, the recesses are formed in the outer surface of the brake tracks, but not in the brake surface core portion. In other examples, the recesses can be formed by corresponding recesses formed in the brake surface core portion 600.

Figure 10:
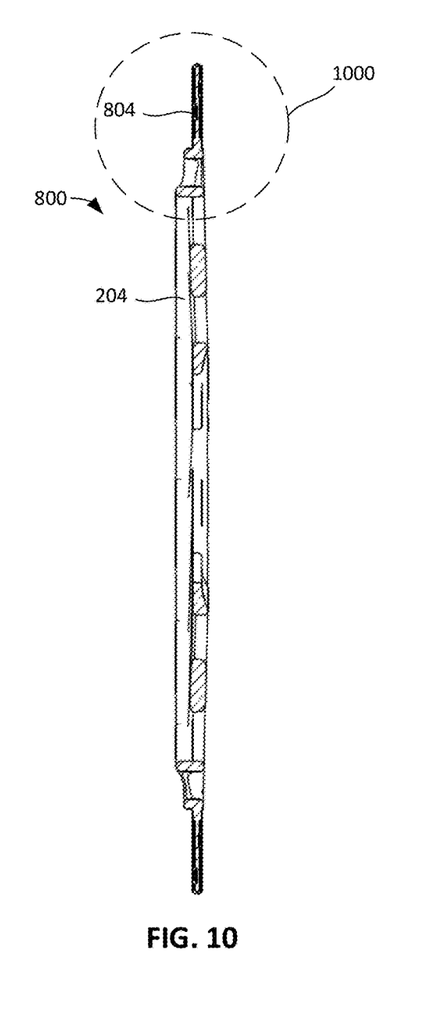
FIG. 10 is a cross-sectional view of the example brake rotor of FIG. 8 taken along line B-B of FIG. 8.

FIG. 10 is a cross-sectional view of the brake rotor 800 taken along line B-B of FIG. 8. The core 204 and the brake track 804 can have similar relative dimensions as disclosed above in connection with the core 204 and the brake track 206 of the brake rotor 200 in FIG. 5.

Figure 11:
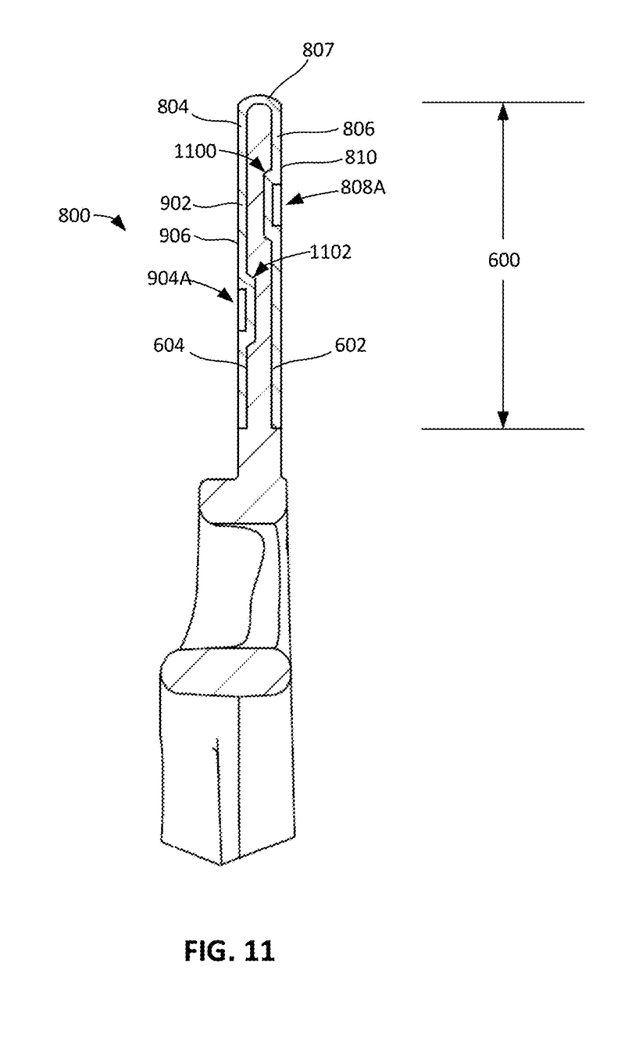
FIG. 11 is an enlarged view of the callout in FIG. 10.

FIG. 11 is an enlarged view of the callout 1000 in FIG. 10. As shown in FIG. 11, the first track 806 is on the first side 602 of the brake surface core portion 600 and the second track 902 is on the second side 604 of the brake surface core portion 600. In particular, the first track 806 of the brake track 804 is in contact with and covers the first side 602 of the brake surface core portion 600, the second track 902 of the brake track 804 is in contact with and covers the second side 604 of the brake surface core portion 600. The brake track 804 can be constructed of any of the example materials and/or via any of the example methods disclosed herein.

In the illustrated example, the brake surface core portion 600 has a first recess 1100 formed in the first side 602 of the brake surface core portion 600. The first recess 1100 does not extend completely through the brake surface core portion 600. The first track 806 is disposed along the contour of the first recess 1100 such that the recesses 808A is formed in the outer surface 810 of the first track 806. Similarly, the brake surface core portion 600 has a second recess 1102 formed in the second side 604 of the brake surface core portion 600. The second recess 1102 does not extend completely through the brake surface core portion 600. The second track 902 is disposed along the contour of the second recess 1102 such that the recess 904A is formed in the outer surface 906 of the second track 902. As shown in FIG. 11, the first recess 1100 is offset from the second recess 1102 in a radial direction. As such, the recess 808A in the first track 806 is offset from the recess 904A in the second track 902 in the radial direction. The other recesses 808, 906 (FIGS. 8 and 9) may be similarly formed by corresponding recesses formed in the first and second sides 602, 604 of the brake surface core portion 600. In some examples, the recesses 808, 904 are formed when the coating material used to form the brake track 804 is sprayed onto the brake surface core portion 600. In particular, the coating material conforms to the shapes of the recesses 1100, 1102 formed in the sides 602, 604 of the brake surface core portion 600. This eliminates the need for forming the recesses 808, 904 via a post-machining process (e.g., etching) after the coating material is applied. Further, this reduces variation in the thickness of the brake track 804. For example, as shown in FIG. 11, the thickness of the brake track 804 is relatively constant. This improves strength and wear resistance.

Moreover, by offsetting the recesses 1100, 1102 formed in the brake surface core portion 600, there is less variation in the thickness of the brake surface core portion 600. This enables more consistent thermal transfer and stress distribution across the brake surface core portion 600. In the illustrated example, the recesses 808, 904 are not fully swept recesses that extend to the connection portion 807. However, in other examples, the recesses 808, 904 may be formed as fully swept recesses that extend across the braking surface (e.g., extend to the connection portion 807, similar to the recess 708 of the example brake rotor 700 of FIG. 7).

Figure 12:
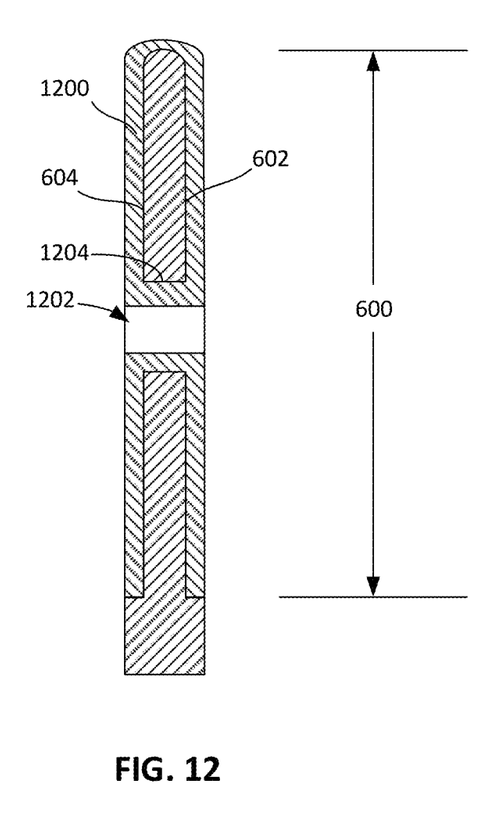
FIG. 12 is a cross-sectional view of an example brake track and example brake surface core portion having an opening, which can be implemented in connection with any of the example brake rotors of FIG. 2, 7, or 8.

While in the example brake rotors 200, 700, and 800 there are no openings or holes extending through the brake surface core portion 600 and the corresponding brake track, in other examples, one or more openings can be provided in the brake surface core portion 600 and the corresponding brake tracks of the rotors 200, 700, and 800. Such openings may be provided to improve airflow and cooling. For example, FIG. 12 is a cross-sectional view of the brake surface core portion 600 with an example brake track 1200, which can represent any of the example brake tracks 206, 702, 804 disclosed above. In the illustrated example, the brake surface core portion 600 includes an opening 1202 (e.g., a hole, an aperture, a bore) extending between the first side 602 and the second side 604 (i.e., through the thickness of the brake surface core portion 600). In the illustrated example, the brake track 1200 covers an inner radial surface 1204 of the brake surface core portion 600 defining the opening 1202. As such, in this example, the brake surface core portion 600 is not visible or exposed. While only one example opening 1202 is shown, in other examples, multiple openings may be formed through the brake surface core portion 600.

From the foregoing, it will be appreciated that the above disclosed brake rotors are lighter than other known brake rotors. As such, the example brake rotors add less weight to a bicycle than known brake rotors. Further, the example brake rotors disclosed herein have improved heat dissipation. As a result, the example brake rotors have reduced braking surface temperatures for more consistent pad-rotor coefficient of friction, lower caliper temperatures for more consistent fluid pressure (when used with hydraulic systems), reduced seal damage, and resistance to brake fluid vapor fad (hydraulic fluid boil). In this manner, the example brake rotors disclosed herein enable improved control of vehicle speed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A brake rotor for a bicycle, the brake rotor comprising:
   a core having a brake surface core portion, the brake surface core portion having a first side and a second side opposite the first side, the brake surface core portion having a first recess formed in the first side; and
   a brake track coupled to the brake surface core portion, the brake track including a first track on the first side of the brake surface core portion, the first track disposed along a contour of the first recess such that a second recess is formed in an outer surface of the first track.

2. The brake rotor of claim 1, wherein the core includes a hub mounting portion and an intermediate portion, the hub mounting portion to be mounted to a hub of the bicycle, the intermediate portion extending between the hub mounting portion and the brake surface core portion.

3. The brake rotor of claim 2, wherein the core is a unitary piece of material.

4. The brake rotor of claim 2, wherein the core has a ledge formed between the intermediate portion and the first side of the brake surface core portion, the first track in contact with the first ledge such that the outer surface of the first track is aligned with an outer surface of the intermediate portion adjacent the ledge.

5. The brake rotor of claim 1, wherein the brake track has a connecting portion extending over a peripheral edge of the brake surface core portion between the first and second tracks, and wherein the brake track is a single unitary piece.

6. The brake rotor of claim 5, wherein the connecting portion of the brake track is at least partially rounded between the first and second tracks.

7. The brake rotor of claim 1, wherein the first recess is offset from the third recess in a radial direction.

8. The brake rotor of claim 1, wherein the brake track includes a set of recess formed in the outer surface of the first track, and wherein at least one of the first set of the recesses intersects any sized concentric circle drawn on a braking surface of the first track.

9. The brake rotor of claim 1, wherein the core is constructed of aluminum and the brake track is constructed of stainless steel.

10. The brake rotor of claim 1, wherein the brake track is formed via a thermal spray process.

11. A brake rotor for a bicycle, the brake rotor comprising:

a core having a brake surface core portion, the brake surface core portion having a first side and a second side opposite the first side, the brake surface core portion having a first recess formed in the first side and a second recess formed in the second side, the first recess offset from the second recess in a radial direction; and a brake track coupled to the brake surface core portion, the brake track including a first track on the first side of the brake surface core portion and a second track on the second side of the brake surface core portion.

12. The brake rotor of claim 11, wherein the core includes a hub mounting portion and an intermediate portion, the hub mounting portion to be mounted to a hub of the bicycle, the intermediate portion extending between the hub mounting portion and the brake surface core portion.

13. The brake rotor of claim 12, wherein the intermediate portion of the core is wider than the brake track.

14. The brake rotor of claim 12, wherein the intermediate portion includes a plurality of openings to enable airflow through the core.

15. The brake rotor of claim 11, wherein the brake track includes a first track on the first side of the brake surface core portion, the first track disposed along a contour of the first recess such that a third recess is formed in an outer surface of the first track.

16. The brake rotor of claim 11, wherein the brake surface core portion includes an opening extending between the first side and the second side, and wherein the brake track covers an inner radial surface of the brake surface core portion defining the opening.

17. The brake rotor of claim 11, wherein the brake track has a connecting portion extending over a peripheral edge of the brake surface core portion between the first and second tracks, and wherein the brake track is a single unitary piece.

18. The brake rotor of claim 11, wherein the core is constructed of aluminum and the brake track is constructed of stainless steel.

\* \* \* \* \*